United States Patent Office 2,789,963
Patented Apr. 23, 1957

2,789,963
STABILIZER COMPOSITION FOR CHLORINE CONTAINING RESINS

Arthur C. Hecker, Richmond Hill, N. Y., assignor to Argus Chemical Corporation, a corporation of New York No Drawing. Application September 28, 1953, Serial No. 382,849

6 Claims. (Cl. 260—45.75)

This invention relates to a stabilizer composition. It relates, more particularly, to the combination of a mercaptoacid stabilizer compound and a preservative therefor.

Condensation products of esters of mercaptoacids with organo-tin halides or oxides are described in U. S. Patent 2,641,596, issued to Leistner and myself on June 9, 1953. The use of these products as stabilizers in polyvinyl chloride resin compositions is described in U. S. Patent 2,641,588, issued to Leistner and Knoepke on the same date.

While these condensation products are excellent stabilizers, a difficulty arises in their storage and subsequent use. Consider the case of a representative one of these condensation products, namely, dibutyltin di-cyclohexyl-thioglycolate. Its formula is

$(C_4H_9)_2Sn(S.CH_2.COOC_6H_{11})_2$

It is a liquid. When this product stands, however, crystals separate. When the crystal fraction is removed and tested separately as a stabilizer for polyvinyl chloride resins, the crystalline material proves to be ineffective. Separation and discarding of this ineffective fraction should be expected to leave a liquid remainder more concentrated than the original product in active stabilizer component. This I have found not to be the case; the liquid that remains after removal of the crystal is less effective per unit of weight than the original fresh whole product.

To explain this, I have postulated the hypothesis that the crystals arise through decomposition of the product on standing. Possible products of the decomposition, it has occurred to me, are (1) the thioglycolate of the formula

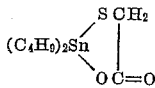

which, by making, I have found to be crystalline, and (2) an acid that, as it accumulates in the system, may accelerate the decomposition. The proportion of tin in the crystals, if my theory of their composition is correct, should be 36.6%. The crystal fraction separated from the stabilizer had an actual tin content of about 36%, the agreement being considered satisfactory as a basis for formulating means to overcome the instability.

Working on this basis, I have introduced a receptor of special kind for acid. I have thus discovered means for reducing the formation of the crystals and for maintaining the effectiveness of the condensation product as a stabilizer.

Briefly stated, my invention comprises an organo-tin mercaptoacid ester stabilizer of kind described in the said patents and an admixed preservative therefor, the preservative being a salt of a bivalent or other multivalent metal with a weak monocarboxylic acid. The invention comprises also a chlorine containing resin compounded wtih the preserved stabilizer composition.

To illustrate the effectiveness of my preservative, polyvinyl resin VYNW (copolymer of polyvinyl chloride and acetate containing 93–95 parts of vinyl chloride for 100 combined weight of the chloride and acetate) was compounded with (1) the crystal fraction separated, after several days' standing, from the condensation product dibutyltin di-cyclobenzylthioglycolate, (2) the liquid remaining after the several days' standing and separation of the crystals, and (3) the original ester mixed when freshly made with calcium 2-ethyl hexoate as preservative, in the proportion of 10 parts for 100 of the condensation product. Proportions of the condensation product, as stabilizer, were the same in all cases, namely, 2 parts for 100 of the VYNW resin and the compoundnig was effected essentially as described in Example 1 of the said Patent 2,641,588. The stability of the material so made was tested by heating at 350° F. and observing the discoloration, if any, at fifteen minute intervals, for 2 hours. The observations follow.

STABILITY TESTS AT 350° F.

| Test No. | Stabilizer Added | Discolored at— |
|---|---|---|
| 1 | Crystal fraction | 15 minutes. |
| 2 | Liquid fraction | 60 minutes. |
| 3 | Whole ester mixed fresh with preservative. | not in 120 minutes. |

Regardless of the correctness of the theory advanced to explain my results, it is a fact that my preservative maintains the effectiveness of the stabilizer and restricts the separation of solid therein, at the worst to a light sludge, for long periods of time.

As to materials, the stabilizer used is any one of those described in said Patent 2,641,596. It is an organo-tin thioglycolate ester condensation product of the type formula

$R'_nSn(SCH_2COO.R'')_{4-n}$ in which R' and R'' represent monovalent groups and $n$ represents an integral number within the range 1–3.

Examples of R' are alkyls, such as methyl, ethyl, butyl, octyl, dodecyl, and octadecyl; aryls, such as phenyl, tolyl, or xylyl; oxyalkyl and oxyaryl, such as $C_3H_7O$, $C_4H_9O$, $C_6H_5O$, $C_6H_3(CH_3)_2O$, and $C_6H_4CH_3O$; and the furfuryl and tetrahydrofurfuryl groups.

Examples of R'' are the radicals n-butyl, sec. butyl, tert. butyl, hexyl, octyl, capryl, dodecyl, and cetyl alcohols; butyl carbitol; and benzyl, cyclohexyl, methylcyclohexyl, tetrahydrofurfuryl and tetrahydroabietyl alcohols.

Instead of the above indicated esters of thioglycolic acid, we may use the corresponding esters of other mercaptoacids, as, for example, thiopropionic, thiobutyric, thiovalerianic and thiocapronic acids.

Taking as specific esters the butyl tin thioglycolic acid butyl esters, the product may have the following formulae:

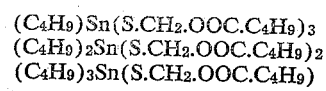

$(C_4H_9)Sn(S.CH_2.OOC.C_4H_9)_3$
$(C_4H_9)_2Sn(S.CH_2.OOC.C_4H_9)_2$
$(C_4H_9)_3Sn(S.CH_2.OOC.C_4H_9)$

The stabilizer must be substantially non-volatile at ordinary temperatures, stable on exposure to air, light, and to moderately elevated temperatures such as 350° to 450° F., and soluble in the selected vinyl resin, i. e. compatible with the resin to an extent that will permit its use in compounding operations that are usual in the industry.

The metal component of my preservative is a multivalent metal, as, for instance, barium, strontium, calcium, magnesium, aluminum, and zinc. For use in resin compositions that are to be substantially colorless, the metal used should be one whose sulfide, which may form in trace proportions at least, during aging, is non-pigmentary, that is, colorless or practically colorless. When color is not objectionable, a metal may be used whose sulfide is pigmentary. Examples of the latter class of metals are lead and cadmium.

The acid represented in the metal salt constituting the preservative is a weak organic monocarboxylic acid. To facilitate proper blending with the stabilizer, the acid used should be one that, in the form of the salt with the selected metal, is soluble in toluol, alcohol, or other organic solvent for the stabilizer. Examples that meet the requirements are branched chain aliphatic ($C_6$ and up) acids and the cyclic-group—containing naphthenic, abietic, and hydrogenated and dehydrogenated abietic acid. Illustrations of the branched chain aliphatic C6 and higher acids that may be used with the desired solubility for their salts with the metals stated are 2-ethyl butyric, 2-ethyl hexanoic, dimethyl hexanoic, 3,5,5, trimethyl hexanoic, and 2,5,8 trimethyl decanoic acids.

The metal salts are made by methods that are conventional for compounds of this class, as by warming an intimate mixture of equivalent amounts of the selected acid and oxide of the metal, until reaction is complete.

The resin compounded with the mixed stabilizer and preservative is one selected from the group consisting of polyvinyl chloride and other vinyl halide polymers and their copolymers with vinyl acetate, vinylidene chloride, styrene, dialkyl fumarate or maleate, or other alkyl esters of mono-olefinic acids. The vinyl halide used is ordinarily and preferably the chloride, although others such as the bromide and fluoride may be used.

As regards the proportions, we use 0.5 parts to 5 parts of the stabilizer for 100 parts of the vinyl resin.

The resin ordinarily is compounded with a substantially non-volatile solvent such as any one of the conventional plasticizers for the resin. in usual proportion. Examples of plasticizers are dibutyl phthalate, dioctyl sebacate, and butyl cresyl phosphate.

The proportion of preservative is less than that of the stabilizer. 1–20 parts are suitable for 100 of the stabilizer. Ordinarily 2–10 parts of the preservative are adequate to prevent decomposition of the stabilizer with the production of crystals and to prevent extensive discoloration of polyvinyl chloride resin compositions containing the stabilizer and preservative, on warming to temperatures of use or to 350° F. for 2 hours or so.

In compounding the resin I may proceed as follows:

For producing a film, the vinyl resin is weighed into a dry blender with my stabilizer and, if desired, a plasticizer, any colors, pigments, and fillers. Thereupon, the whole mass is agitated, as by tumbling, to produce a uniform blend. The material is then transferred to a Banbury mixer. where it is fused or fluidized at elevated temperatures. Thereafter, the material is dropped and transferred to a warm-up mill and from there to a 3 or a 4 roll-calender. Here the material is sheeted out in the form of a film of desired gage.

In making solutions of vinyl resins compounded with the use of our plasticizers, the material is sheeted out in strips directly from the warm-up mill and then dissolved in a churn or suitable mixer after the addition of the selected solvent.

To make extruded products, the sheeted product is transferred to an extruder. Here it is formed into sheets of various shapes or pelleted for molding or subsequent extrusion procedures.

Mixing operations and other processing steps are conventional except as herein stated to the contrary.

The invention will be illustrated by further description in connection with the following specific examples of the practice of it.

*Example 1*

A mixture was made of 92 parts by weight (1 mol) of thioglycolic acid and 143 parts (1.1 mols) of isooctanol, with 30 parts of benzol as liquid to promote carrying out of the water to be formed during the esterification. After the proper amount of water has been azeotroped off, the reaction mixture containing isooctyl thioglycolate was allowed to cool. Then 124 parts (approximately 0.5 mol) of dibutyl tin oxide were added.

The whole mixture was heated again until another half mol of water was azeotropically distilled out. This required about two hours heating.

The resulting condensation product, dibutyltin di-isooctylthioglycolate in benzol solution, was cooled.

Within two days a substantial quantity of crystals formed on the bottom and side walls of the container, these crystals involving loss of activity of the product as a stabilizer for polyvinyl resin compositions.

Another specimen of the condensation product similarly made was mixed, when freshly made, with calcium octoate in the proportion of 10 parts by weight for 300 of the condensation product, on the benzol free basis. The thus preserved product did not show the development of crystals. During the 8 months that the test has progressed, the sample has remained clear except for a very light sludge on the bottom of the container.

The preserved stabilizer was compounded as described above with vinyl resin VYNS (copolymer of vinyl chloride and vinyl acetate including 88.5%–90.5% of the chloride) in the proportion of 2 parts for 100 of VYNS and found to pass the 2 hour stability test without substantial discoloration.

*Example 2*

The procedure of Example 1 is followed except that the calcium octoate there used is replaced by an equivalent weight of the octoate of magnesium, strontium, barium, aluminum, and zinc, each being used in turn separately or in mixtures of two or more of said metals.

*Example 3*

The procedure of Examples 1 and 2 is followed except that the octoic acid represented in the salt used as the preservative is replaced by an equivalent weight of each of the other said monocarboxylic acids listed above, the acids being used separately or mixed with each other.

Compositions made as described and containing the mercaptoacid derivatives as stabilizers in combination with my preservative therefor are effective as stabilizers for the chlorine containing resins of kind described and maintain their activity as stabilizers over long periods of time.

It will be understood that it is intended to cover all changes and modifications of the example of the invention herein chosen for the purpose of illustration which do not constitute departures from the spirit and scope of the invention.

What I claim is:

1. A stabilizer composition for polyvinyl chloride resins comprising a condensation product of the type formula $R'_n Sn(SCH_2COO.R'')_{4-n}$, in which $R'$ and $R''$ represent monovalent units selected from the group consisting of hydrocarbon radicals and oxyhydrocarbon radicals, and $n$ represents an integral number within the range 1–3, and a preservative for the condensation product, the preservative being a salt of a metal selected from the group consisting of barium, strontium, calcium, magnesium, aluminum, and zinc with a monocarboxylic $C_6$–$C_{20}$ organic acid that, in the form of a salt with the said metal, is soluble in an organic solvent for the stabilizer and the salt being in proportion less than that of the condensation product.

2. The composition of claim 1 in which the stabilizer is dibutyltin di-isooctyl-thioglycolate and the preservative is calcium 2-ethyl hexoate.

3. The composition of claim 1 in which the preservative is calcium 2-ethyl hexoate.

4. The composition of claim 1 in which the preservative is zinc naphthenate.

5. A composition including a resin selected from the group consisting of polyvinyl chloride and its copolymers with vinyl acetate, vinylidene chloride, styrene, and alkyl esters of mono-olefinic acids and the stabilizer composition of claim 1 dispersed in the said resin.

6. A stabilizer composition for resins selected from the group consisting of polyvinyl chloride and its copolymers with vinyl acetate, vinylidene chloride, styrene, and alkyl esters of mono-olefinic acids, the stabilizer comprising a condensation product of the type formula $R'_n Sn(SCH_2COO \cdot R'')_{4-n}$, in which $R'$ and $R''$ represent monovalent units selected from the group consisting of hydrocarbon radicals and oxyhydrocarbon radicals, and $n$ represents an integral number within the range 1–3, and a preservative for the condensation product, the preservative being a salt of a metal selected from the group consisting of barium, strontium, calcium, magnesium, aluminum, and zinc with a monocarboxylic $C_6$–$C_{20}$ organic acid that, in the form of a salt with the said metal, is soluble in an organic solvent for the stabilizer and the salt being in proportion less than that of the condensation product.

References Cited in the file of this patent

UNITED STATES PATENTS

| | | |
|---|---|---|
| 2,564,646 | Leistner et al. | Aug. 14, 1951 |
| 2,641,588 | Leistner et al. | June 9, 1953 |
| 2,648,650 | Weinberg et al. | Aug. 11, 1953 |